United States Patent [19]

Suga

[11] Patent Number: 4,747,099
[45] Date of Patent: May 24, 1988

[54] PCM COMMUNICATION APPARATUS
[75] Inventor: Kiyokazu Suga, Tokyo, Japan
[73] Assignee: NEC Corporation, Tokyo, Japan
[21] Appl. No.: 867,067
[22] Filed: May 27, 1986
[30] Foreign Application Priority Data
  May 25, 1985 [JP]   Japan .................................. 60-111355
[51] Int. Cl.$^4$ .............................................. H04J 3/00
[52] U.S. Cl. .................................................... 370/77
[58] Field of Search .......................... 370/58, 77, 100; 375/25

[56] References Cited
U.S. PATENT DOCUMENTS
4,293,953 10/1981 Gutleber ............................... 375/25
4,468,789 8/1984 Gromen .................................. 375/25
4,542,492 9/1985 Bodros et al. ......................... 370/77

OTHER PUBLICATIONS
CCITT Recommendation 6.704, "Functional Characteristics of Interfaces Associated with Network Nodes", International Telecommunication Union VIIIth Plenary Assembly, Red Book, vol. III, Facsimile III.3, pp. 69–80, Oct. 1984.
"Digital Networks-Transmission Systems and Multiplexing Equipment", CCITT, *International Telecommunication Union*, pp. 67–74, Nov. 1980.

Primary Examiner—Douglas W. Olms
Assistant Examiner—Wellington Chin
Attorney, Agent, or Firm—Leydig, Voit & Mayer

[57] ABSTRACT

A PCM communication apparatus including a plurality of channel units which receive input signal and a multiplexer unit which multiplexes signals. Each channel unit includes a digital conversion circuit which responds to an input signal by encoding the input signal and outputting the encoded signal and which responds to the absence of an input signal by outputting a predetermined encoded signal having zero-value bit positions. The channel unit further includes a code conversion circuit that inverts the bit positions of the signal output by the digital conversion circuit which correspond to the zero-value bit positions of the predetermined encoded signal and then outputs the converted signal. The multiplexer unit includes a means for coupling data lines to a reference voltage, the channel units being connected to the data lines, and a plurality of code reconversion circuits which reinvert the bit positions of each pulled up converted signal which correspond to the zero-bit positions of the predetermined encoded signal. The code reconverting circuit then outputs a reconverted signal. Further, the multiplexer unit includes a multiplexing device for time division multiplexing the reconverted signals.

11 Claims, 2 Drawing Sheets

PCM COMMUNICATION APPARATUS

BACKGROUND OF THE INVENTION

The present invention relates to a PCM communication apparatus for multiplexing signals on a plurality of channels and, more particularly, to a PCM communication apparatus constructed such that a code allocated to a time slot of a non-connected channel when the number of channels connected to a multiplexer unit is smaller than allowed multiplicity and a code appearing in a time slot of a particular channel which is connected to the multiplexer unit but not supplied with an input signal, i.e., idle channel, are identical with each other.

In a PCM communication apparatus of the type described, it has been customary to encode input signals channel by channel and cause a multiplexer unit to time division multiplex output signals on the respective channels for sending them out to a communication link.

Electronic circuits assigned to the channels are respectively accommodated in packages to constitute channel units which are in turn connected to input connectors of the multiplexer unit. Data lines at the input side of the multiplexer unit are pulled up or pulled down so that the input levels of the channel signals may be freed from instability. Usually, the input data lines are pulled up because should they be pulled down, the level of logical ONEs which are included in channel codes would be lowered proportionally to division of resistance effected by pull-down resistors and, thereby, liable to be erroneously determined as ZEROs. In the pull-up type arrangement, when any of the channel units is not connected to the multiplexer unit, a disengaged channel input level at the multiplexer unit becomes a ONE so that the multiplexer unit multiplexes a sequence of ONEs representative of a disconnected state together with data on the other channels. However, where a code consisting of a sequence of ONEs is one of the channels, the non-connected channel appears as if it were busy.

To settle such a problematic situation, there has been proposed a system in which a multiplexer unit uses special monitor lines for monitoring connections of channels. In this system, when any channel is not connected, the multiplexer unit detects an open state of the associated monitor line at its disengaged channel input side. In response to the detection of the open state, the multiplexer unit generates a code identical with a particular one which is generated when any channel is idle, that code being multiplexed together with other channel data. Hence, the non-connected state of the channel unit is treated as an idle state of channel data. The problem with this implementation is that the monitor lines must be connected one to each channel unit for the detection of disengaged channels which increases the number of connectors necessary for the connection of the monitor lines, resulting in an expensive construction and a disproportionate space requirement.

SUMMARY OF THE INVENTION

It is therefore an object of the present invention to provide a PCM communication apparatus which, when a channel unit is not connected to a multiplexer unit, transmits the non-connected state with accuracy and sends the same code as an idle code which occurs in a channel connected condition without resorting to any special means otherwise required to detect connections of channel units.

A PCM communication apparatus of the present invention produces encoded data by encoding input signals channel by channel according to a predetermined encoding rule, and then multiplexes the encoded data. The PCM communication apparatus comprises several channel units and each of channel units includes encoding means for encoding an input signal according to the predetermined encoding rule and, when the input signal is absent, generating a particular code. Each of the channel units further includes code converting means responsive to an output of the encoding means for inverting codes of those bits which correspond to ZERO code positions of the particular code. The PCM communication apparatus further comprises a multiplexer unit which includes means for coupling data lines to a reference voltage, the channels being individually plugged in to the data lines. The multiplexer unit also includes several reconverting means, each for reconverting those codes at bit positions which were inverted by the code converting means. Further, the multiplexer unit includes multiplexing means for time division multiplexing outputs of the code reconverting means.

The object of the present invention is achieved due to provision of the code converting means and the code reconverting means.

BRIEF DESCRIPTION OF THE DRAWINGS

The present invention will be better understood from the following detailed description taken in conjunction with the accompanying drawings in which.

DETAILED DESCRIPTION OF THE PREFERRED EMBODIMENT

Figure 1:
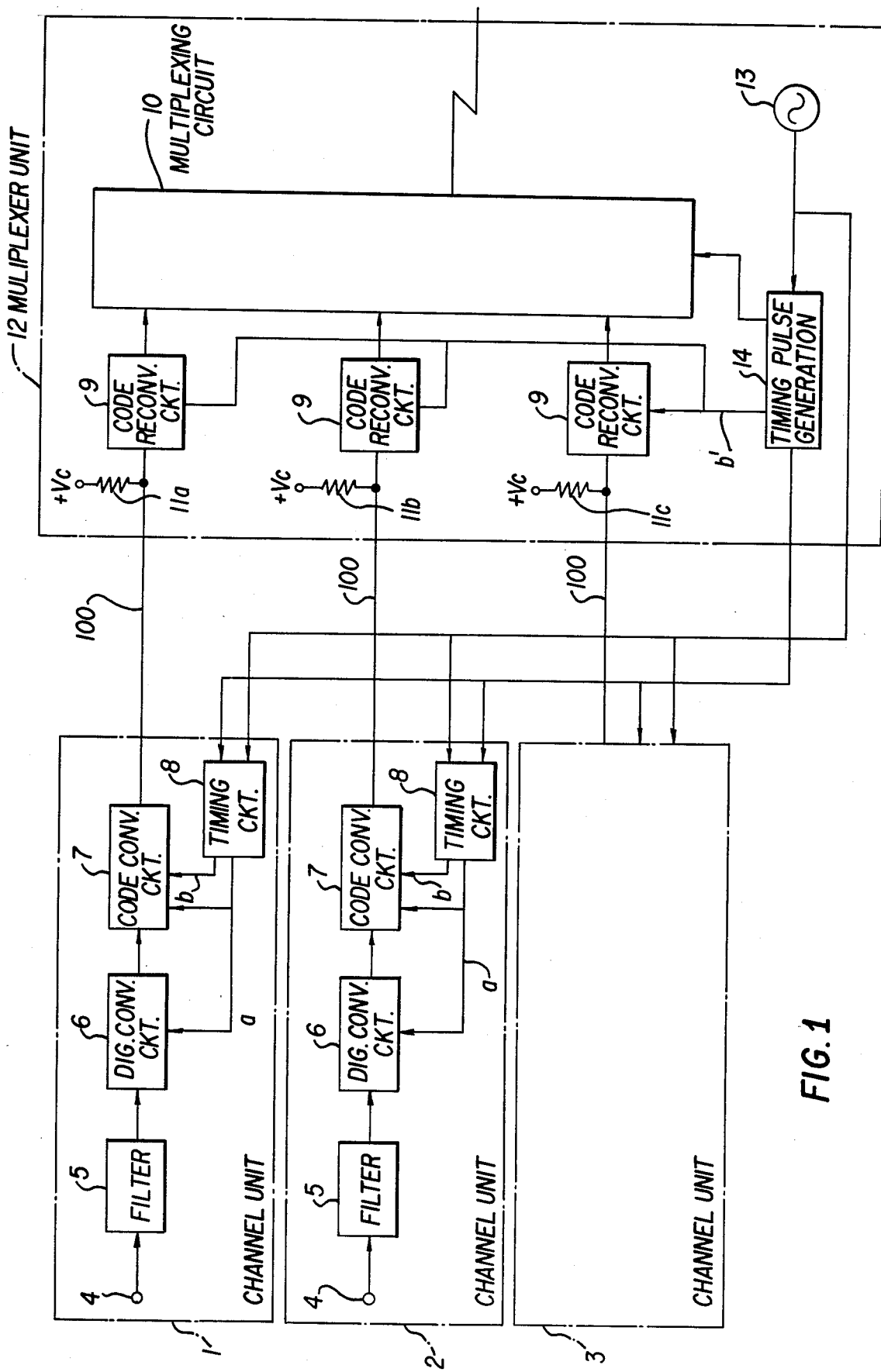
FIG. 1 is a block diagram of a PCM communication apparatus embodying the present invention.

Referring to FIG. 1 of the drawings, a PCM communication apparatus of the present invention embodying the present invention is shown and includes channel units 1, 2 and 3 and a multiplexer unit 12. In this particular embodiment, the apparatus is a PCM terminal constructed to encode voice frequency signals as prescribed by CCITT (Consultative Committee of International Telegraph and Telephone) Recommendation G.711, A-law and then multiplex output data on respective channels. The channel units 1, 2 and 3 which are identical in construction are connected to individual data lines 100 through connectors, not shown.

As shown in FIG. 1, the channel unit 1 comprises an input terminal 4 to which an analog voice signal is applied, a filter 5 for limiting the frequency band of the voice signal, a digital conversion circuit 6 adapted to encode the voice signal according to CCITT Recommendation G.711, A-law, a code conversion circuit 7 in accordance with the present invention, a timing setting circuit 8 for supplying encoding timing pulses to the circuits 6 and 7 responsive to timing pulses which are delivered to the circuit 8 from the multiplexer unit 12.

The digital conversion circuit 6 encodes the voice signal based on the A-law to generate an eight-bits code. When the channel does not send any voice signal, the circuit 6 generates an idle code "11010101" or "01010101" according to the encoding rule as prescribed by the A-law. Here, the first bit of the idle code is representative of a polarity of the data. The code conversion circuit 7 inverts the input digital signal at each ZERO position of the idle code and, hence, the third, fifth and seventh bits of the A-law code are inverted.

The multiplexer unit 12 comprises code reconversion circuits 9 each of which is adapted to invert those bits of the code which have been inverted by the associated circuit 7 to restore the original A-law code, a multiplexing circuit 10 for multiplexing outputs of the circuit 9 on a time division basis, a clock generator 13 for generating a reference clock, and a timing pulse generation circuit 14 adapted to generate timing pulses for controlling the multiplexing timing as well as the respective channel operation timings.

Assuming that the channel unit 1, for example, is in an idle state, the digital conversion circuit 6 delivers an idle code, i.e. "11010101" or "01010101". Since the code conversion circuit 7 inverts the idle code at its ZERO positions, i.e., the third, fifth and seventh bits of the A-law code, it produces an output code "11111111" or "01111111". Meanwhile, the input data lines 100 of the multiplexer unit 12 are connected to a power source Vc via pull-up resistors 11a, 11b and 11c, respectively, so that the code level may be prevented from becoming unstable. Hence, so long as the channel unit is not connected to the line 100, a code ONE flows through the line 100 at all times. In this condition, continuously flowing through the line 100 from the idle channel is a code "11111111" which is identical with the code supplied from the idle channel unit. As previously mentioned, each code reconversion circuit 9 reinverts the third, fifth and seventh bits of the code which have been inverted by the code conversion circuit 7 of the associated channel, so that the idle code "01111111" or "11111111" is restored to "01010101" or "11010101". Even when the channel unit is not connected to the multiplexer unit 12, the circuit 9 produces an output code "11010101" which is identical with the channel idle code. This, while any of the channel units is not connected to the multiplexer unit 12, prevents the associated channel from appearing as if it were busy.

Figure 2:
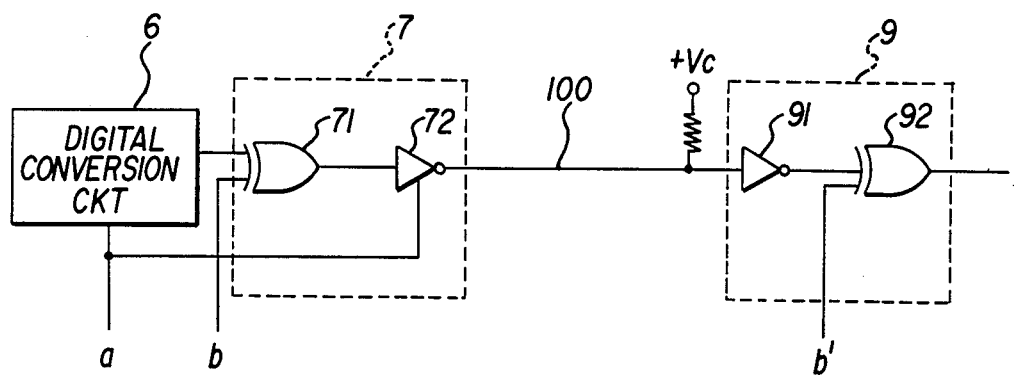
FIG. 2 is a block diagram showing a part of the apparatus of FIG. 1 in detail.

Referring to FIG. 2, the code conversion circuit 7 comprises an exclusive-OR (Ex-OR) gate 71 to which the A-law data is supplied from the digital conversion circuit 6, and a three-states NOT gate 72. The code reconversion circuit 9 comprises a NOT gate 91 and an Ex-OR gate 92.

Figure 3:
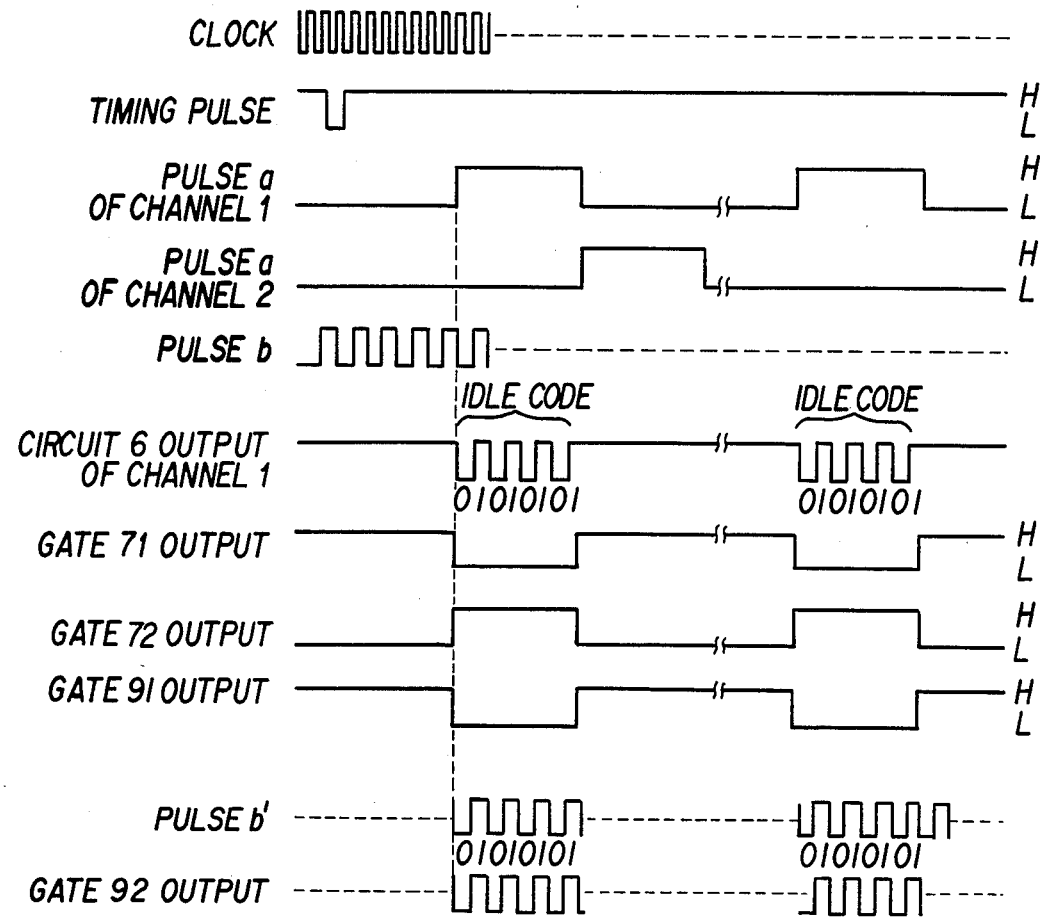
FIG. 3 is a timing chart demonstrating the operation of the apparatus shown in FIGS. 1 and 2.

The operation of the arrangements shown in FIGS. 1 and 2 will be described with reference also made to the timing chart of FIG. 3. In each channel unit, the timing setting circuit 8 receives a clock signal CLK from the clock generator 13 and timing pulses from the timing pulse generation circuit 14. Each of the timing pulses is representative of the leading time slot of a frame which the multiplexing circuit 10 produces by multiplexing data on the respective channels. Further, the circuit 8 produces encoding timing pulses a and even bit inverting pulses b. Appearing one for each frame of the multiplexed signals, the encoding timing pulses have a pulse width which is equal to the length of one A-law code. The encoding timing pulse a on any of the channels occurs one pulse later than the encoding timing pulse on the immediately preceding channel, as shown in FIG. 3. In each of the channel unit, the digital conversion circuit 6 produces one A-law data during reception of one encoding timing pulse. Meanwhile, the even bit inverting pulses b are applied to the Ex-OR gate 71 and become high level at even bits of the output code of the circuit 6 to invert those bits of the code. The three-states NOT gate 72 inverts inputs thereto when supplied with the pulses a and assumes a high impedance state when not supplied with those pulses. Therefore, while the pulses a are high level, the idle data "11010101" and "01010101" become respectively "10000000" and "00000000" at the gate 71 and then turn into "01111111" and "11111111" when passed through the gate 72.

Each code reconversion circuit 9 inverts the input data by the gate 91 and then inverts even bits of the A-law code by means of the Ex-OR gate 92, to which even bit inverting pulses b' are applied. In this manner, the circuit 9 inverts the code in the opposite manner to the circuit 7, so that the output of the gate 92 is the original A-law code. Naturally, even if the channel is not connected to the data line 100, the gate 92 outputs A-law data "01010101" representative of an idle state.

The multiplexing circuit 10 time-serially arranges the output data of the reconversion circuits 9 so as to send them as one frame data to a communication link.

In the illustrative embodiment, the data to be transmitted are assumed to be encoded data as prescribed by CCITT Recommendation G.711, A-law. However, the present invention is not limited to the application of the A-law and, so long as a particular code which is to be generated on any channel when a channel input signal is absent is predetermined, it is applicable to codes which are encoded by an encoding rule other than the A-law.

In summary, it will be seen that in accordance with the present invention the idle channel data which is delivered from any of channel units to a multiplexer unit when the former is connected to the latter is identical with data which is generated when the former is not connected to the latter. This, when the channel unit is not connected, prevents the non-connected channel from appearing as if it were connected.

What is claimed is:

1. A PCM communication apparatus which encodes an input signal on each of a plurality of channels according to a predetermined encoding rule and multiplexes the encoded data on the respective channels comprising:
    a plurality of channel units, each including encoding means for encoding an input signal according to the encoding rule and, while the input signal is absent, generating a particular code, and code converting means responsive to an output of said encoding means for inverting codes of those bits which correspond to ZERO code positions of said particular code; and
    a multiplexer unit including means for coupling data lines to a reference voltage, said channel units being individually connected to the data lines, a plurality of code reconverting means each for reinverting those codes at bit positions which are to be inverted by said code converting means, and multiplexing means for time division multiplexing outputs of said code reconverting means.

2. A PCM communication apparatus comprising:
    a plurality of channel units, each including encoding means responsive to an input signal for encoding the input signal and outputting the encoded signal and responsive to the absence of an input signal for outputting a predetermined encoded signal having zero-value bit positions and further including code converting means coupled to the encoding means for inverting the bit positions of the signal output by the encoding means which correspond to the zero-value bit positions of the predetermined encoded signal and outputting the converted signal; and a multiplexer unit including means for coupling, to a reference voltage, lines carrying each converted signal output by the channel units, and a plurality of code reconverting means for reinverting the bit positions of each converted signal which correspond to the zero-value bit positions of the predetermined encoded signal and outputting the reconverted signal, and multiplexing means for time division multiplexing the reconverted signals.

3. The PCM communication apparatus according to claim 2 wherein the multiplexer unit further includes clock means for generating a clock signal, timing pulse generating means responsive to the clock signal for generating timing pulses, and means for supplying the clock signal and the timing pulses to the channel units.

4. The PCM communication apparatus according to claim 3 wherein each channel unit further includes time setting means responsive to the clock signal and the timing pulses for supplying encoding timing pulses to the encoding means.

5. The PCM communication apparatus according to claim 3 wherein each channel unit further includes time setting means responsive to the clock signal and the timing pulses for supplying bit inverting pulses to the code converting means.

6. The PCM communication apparatus according to claim 5 wherein the code converting means includes an exclusive OR gate having as inputs the bit inverting pulses and the signal output by the encoding means.

7. The PCM communication apparatus according to claim 6 wherein the time setting means includes means for supplying encoding timing pulses to the code converting means and wherein the code converting means further includes a three-state NOT gate having as an input the output of the exclusive OR gate and having as a control signal the encoding timing pulses.

8. The PCM communication apparatus according to claim 2 wherein the multiplexer unit further includes clock means for generating a clock signal, and means responsive to the clock signal for supplying bit inverting pulses to the code reconverting means.

9. The PCM communication apparatus according to claim 8 wherein the code reconverting means includes an exclusive OR gate having the bit inverting pulses as an input.

10. The PCM communication apparatus according to claim 9 wherein the code reconverting means includes a NOT gate having the converted signal as an input and wherein the exclusive OR gate has as an additional input the output of the NOT gate, the output of the exclusive OR gate being supplied to the multiplexing means.

11. The PCM communication apparatus according to claim 2 wherein the coupling means includes a power supply and a resistor connected in series to the input of the reconverting means.

* * * * *